United States Patent [19]
Takimoto et al.

[11] Patent Number: 5,395,101
[45] Date of Patent: Mar. 7, 1995

[54] CLAMP FOR USE IN OPTICAL FIBER COUPLER MANUFACTURING APPARATUS

[75] Inventors: Hiroaki Takimoto; Hiroshi Suganuma; Junichi Yoshikawa, all of Kanagawa; Kazuhiko Arimoto, Tokyo, all of Japan

[73] Assignees: Sumitomo Electric Industries, Ltd., Osaka; Sumiden Opcom, Ltd., Tokyo, Japan

[21] Appl. No.: 212,689

[22] Filed: Mar. 14, 1994

Related U.S. Application Data

[63] Continuation of Ser. No. 818,585, Jan. 9, 1992, abandoned.

[30] Foreign Application Priority Data

| Jan. 25, 1991 | [JP] | Japan | 3-023850 |
| Feb. 2, 1991 | [JP] | Japan | 3-033599 |
| Mar. 6, 1991 | [JP] | Japan | 3-065514 |

[51] Int. Cl.6 .................................. B23Q 3/00
[52] U.S. Cl. .................. 269/289 R; 269/25; 269/902; 269/903
[58] Field of Search .............. 269/289 R, 296, 902, 269/903, 25

[56] References Cited

U.S. PATENT DOCUMENTS

| 4,139,189 | 2/1979 | Wietrzyk | 269/902 |
| 4,562,632 | 1/1986 | Parchet et al. | 269/902 |
| 4,623,156 | 11/1986 | Moisson et al. | 269/902 |
| 4,727,742 | 3/1988 | Weaver | 72/402 |
| 4,756,518 | 7/1988 | Varin et al. | 269/903 |

FOREIGN PATENT DOCUMENTS

| 0047691 | 3/1982 | European Pat. Off. . |
| 0370465 | 5/1990 | European Pat. Off. . |
| 0176623 | 4/1986 | Germany . |
| 2-014430 | 6/1977 | Japan . |
| 63-118705 | 5/1988 | Japan . |
| 64-80913 | 3/1989 | Japan . |
| 1-94904 | 6/1989 | Japan . |
| 2-123308 | 5/1990 | Japan . |
| 2-211409 | 8/1990 | Japan . |

*Primary Examiner*—Bruce M. Kisliuk
*Assistant Examiner*—Eileen Morgan
*Attorney, Agent, or Firm*—Cushman Darby & Cushman

[57] ABSTRACT

A clamp for optical fiber couplers manufacturing apparatus comprises a slotted member having a slot into which optical fibers are inserted and having an opening outwardly winder from the slot so that the optical fibers are introduced into the slot, and a pushing member movably disposed adjacent the slot for pushing the optical fibers through the opening into the slot, wherein the slotted member is away from the pushing member when the fibers are not clamped, and the slotted member is fixed at a position where the slotted member clamps the fibers.

7 Claims, 16 Drawing Sheets

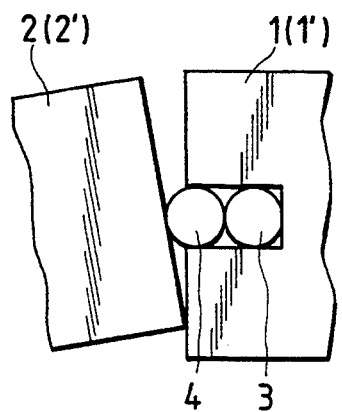
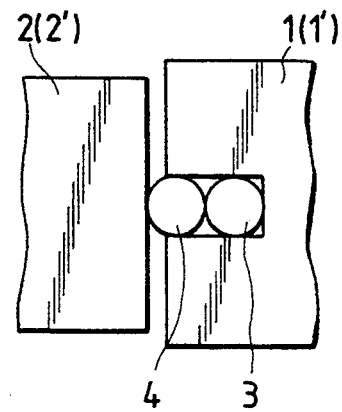
FIG. 16A    FIG. 16B
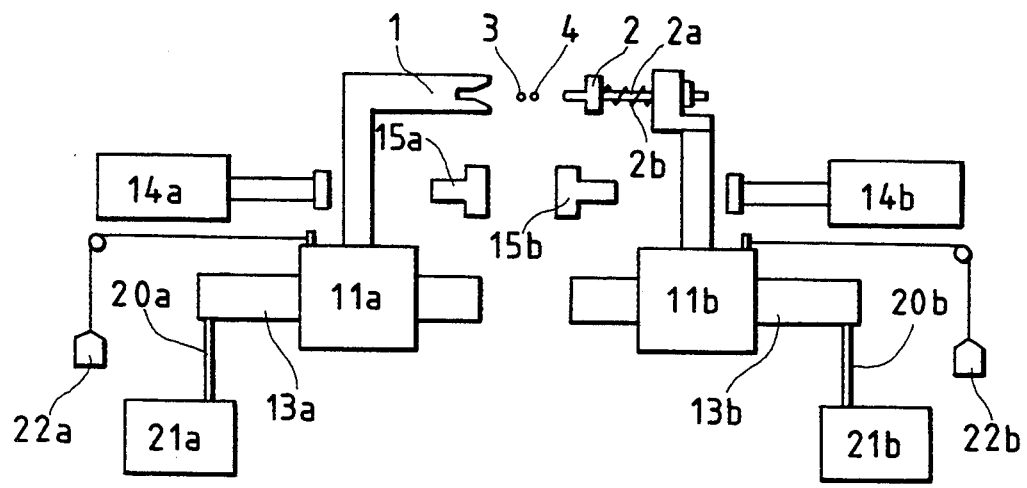
FIG. 17
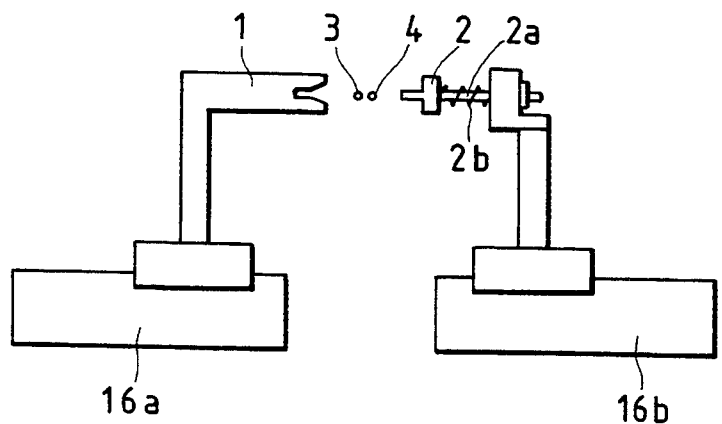
FIG. 18

CLAMP FOR USE IN OPTICAL FIBER COUPLER MANUFACTURING APPARATUS

This is a continuation of application Ser. No. 07/818,585, filed on Jan. 9, 1992, which was abandoned upon the filing hereof.

BACKGROUND OF THE INVENTION

1. Field of the Invention

The present invention relates to a clamp for optical fibers used in an apparatus which manufacturers optical fiber couplers for communication systems and sensor systems.

2. Description of the Art

An important component in configuring optical communication systems and optical data link networks is an optical splitter to distribute the optical signal from the light source with a desired ratio. One such optical splitter is constructed of a number of fiber couplers melted together with heat and then drawn under a predetermined tensile force. For the melting process, the glass portions of the optical fibers must be parallel and are so held with a clamp mechanism. The accuracy of the clamp's position greatly influences the characteristics of manufactured optical fiber coupler.

Conventional clamps, as disclosed in Japanese Patent Preliminary Publication No. 63-118705, hold the optical fibers in two directions. FIG. 1 is a perspective view of a clamp described in JP No. 63-118705. Two optical fibers 3 and 4 are held in a vertical direction by a clamp 32. The vertically aligned fibers are then held in a horizontal direction by a horizontal position adjusting device.

The clamp in FIG. 1 consists of two axially spaced clamps that combined, hold the fibers in the vertical and horizontal directions while clamping the fibers in a twisted form. If the height of the slot in clamp 32 is greater than the diameters of the optical fibers 3 and 4, the fibers will no be placed in proper position within the slot, as shown in FIG. 2, thereby making it difficult to horizontally align the fibers side-by-side.

FIG. 3 shows two position adjusting devices 30 and 31. One adjusting device 30 for the horizontal position and the adjusting device 31 for the vertical position. In this configuration, one of the adjusting devices tends to clamp the fibers 3 and 4 before the other adjusting device clamps the fibers. If the horizontal position adjusting device 30 is the first to clamp the fibers, it is possible that the fibers will look like that shown in FIG. 4B rather than that shown in FIG. 4A.

After the horizontal adjusting device is in position, adjusting device 31 clamps the fibers so that the fibers clamped by the device 30 are like that in FIG. 4C while the fibers clamped by the device 31 are like that in FIG. 4D. The two optical fibers continue to be improperly axially positioned. The result is the same when the vertical adjusting device 31 clamps the optical fibers first. It is difficult, therefore, to have the optical fibers properly clamped using the conventional ways of clamping shown in FIGS. 1 and 3.

Meanwhile Japanese Utility model Preliminary Publication No. 1-94904 discloses an optical fiber fixing device which uses a pair of optical fiber sandwiching devices having a thickness and a level difference smaller than the diameter of the optical fibers and greater than the radius. However, this fiber fixing device is not easy to use.

Japanese patent Preliminary Publication No. 64-80913 discloses an optical fiber fixing device where the two optical fibers are received in the V-shaped slot of each of the two halves of a block. The two halves of the block are put together such that the two fibers are pressed against each other for a closely sandwiched condition.

The depth of the V-shaped slot cannot be made greater than the diameter of the two optical fibers 3 and 4. Otherwise, the optical fibers 3 and 4 will no be in contact with each other correctly when the two halves of block are put together, as shown in FIG. 5A.

In FIG. 5A, the angle of the V-shaped slot is 90 degrees. For the fibers to be sandwiched together properly, the possible maximum width M of the opening of V-shaped slot is given $2(1+\sqrt{2})r$ where r is the radius of the optical fibers. Therefore, the possible maximum width D of the V-shaped slot shown in FIG. 5C is M, as shown in FIG. 5B, wherein D is defined by $2(1+\sqrt{2})r$. If the diameter 2r of the optical fiber is 125 $\mu$m, then M is approximately 600 $\mu$m.

As a practical matter, the opening width D of the V-shaped slot is in the range of 200 to 300 $\mu$m, which is very small. Consequently, the operation of inserting an optical fiber into the V-shaped slot must be performed under a microscope.

Since the two optical fibers tend to curl, it is quite rare that the two optical fibers are held perfectly parallel by the V-shaped slot. The device disclosed by Japanese Patent Preliminary Publication No. 64-80913 requires an operator to ensure that the optical fibers are completely inserted into the V-shaped slot. This operation is carried out under a microscope, which causes fatigue of the operator's eyes.

SUMMARY OF THE INVENTION

The present invention was made in view of the aforementioned drawbacks. An object of the invention is to provide a clamp for optical fibers which is easy to use and which effectively and efficiently ensures that the optical fibers are held parallel.

The clamp in the present invention is used for manufacturing optical fiber couplers used in an optical fiber coupler manufacturing apparatus- In the apparatus, glass portions of a number of optical fibers are fused, heated, and drawn. The clamp has first and second substantially L-shaped portions which are movably disposed so that the clamp can push the optical fibers together. When the device is not clamping, the two portions are spaced apart from the optical fibers. When the device is clamping, the said first L-shaped portion is fixed at a position where clamping will be achieved, and the said second L-shaped portion is pushed toward the optical fibers and the other L-shaped portion to a position where clamping is achieved.

Another embodiment of the present invention clamps the optical fibers with a slotted member which optical fibers can be inserted. The slot has an opening outwardly wider from said slot such that the optical fibers are able to be introduced into the slot. There is a pushing member movably disposed adjacent to the slot such that the pushing member pushes the optical fibers through the opening into the slot. The slotted member is away from said pushing member when fibers are not being clamped, and said slotted member is fixed in position where the slotted member clamps the fibers.

For the most effective results, a clamp for optical fibers manufacturing apparatus according to the invention consists of a pair of clamps. Each includes a slotted member having a slot into which the optical fibers can be inserted and a movable pushing member such that it pushes the optical fibers into said slot of said slotted member. Each of pushing members is provided with an urging means for imposing a pressing force toward said slot.

Yet another embodiment of the clamp in the invention has two rectangular L-shaped portions. The L-shaped portions are spaced apart so that the optical fibers can be inserted, the optical fibers are pushed into a defined space between the two L-shaped portions. In the examples, one or both of the two L-shaped portions may be supported by an air slider so that the L-shaped portions experience minimum frictional forces when they are moved. Shutting off the air supplied to the air floating bearing effects the positioning of the clamp.

A clamp, according to the invention, inserts the optical fibers into the slot. The optical fibers are positioned at the optical-clamp feeding portion of the slotted member. The pushing member is then moved so that it pushes the optical fiber into the slot through the optical-clamp feeding portion. The pushing member and the slotted member may be supported by air floating bearings. In this manner, the pushing member and slotted member may be moved with only small frictional forces. Shutting off the air supplied to the air floating bearings permits the pushing and the slotted member to be placed in position.

With the slotted member and the pushing member spaced from each other, optical fibers can be positioned in the slot of the slotted member. Then the pushing member is moved so as to push the optical fiber into the slot.

The pushing members can be urged by a spring. The pushing members will therefore have the correct pressing force at proper position against the respective slotted member. This will ensure the optical fibers are accurately aligned.

BRIEF DESCRIPTION OF THE DRAWINGS

FIGS. 16A and 16B show the fibers being clamped by the pushing-member of the invention;

FIG. 17 Shows another embodiment of a drive mechanism for an optical fiber clamp according to the invention;

FIG. 18 shows another embodiment of a drive mechanism for an optical fiber clamp according to the invention;

DETAILED DESCRIPTION OF THE PRESENTLY PREFERRED EXEMPLARY EMBODIMENTS

Figure 6:
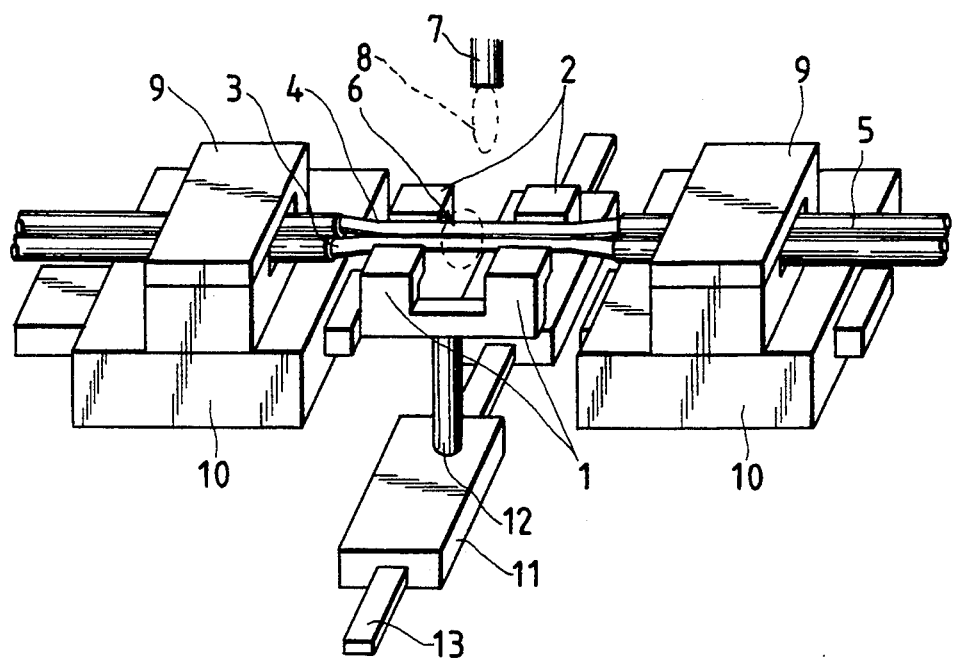
FIG. 6 shows a general construction of an embodiment of an optical/fiber coupler manufacturing apparatus according to the invention.

FIG. 6 is a general perspective view of an optical fiber coupler manufacturing apparatus showing one basic embodiment of the invention. In FIG. 6, reference numeral 1 denotes the slotted members, 2 the pushing members, 3 and 4 glass portions of optical fibers, 5 a coating of an optical fiber, 6 heat fusing connection portion, 7 a burner, 8 a flame, 9 a clamp for the coating, 10 a drawing stage, 11 a slider, 12 a stand, and 13 a guide shaft. The slider 11 and the guide shaft 13 form a linear bearing.

The clamp is constructed so that the slotted member 1 and the pushing member 2 can receive the glass portions of the optical fibers. The outer coating 5 of the optical fibers are stripped away to expose the glass portions. The optical fibers are fixed in place by the outer coating clamp 9. The outer coating clamp 9 is positioned on the drawing stage 10 which is used to draw the two optical fibers in the axial direction. To align the optical fibers and keep them in parallel, the slotted members and the pushing member are pushed together by the slider along the guide shaft so that they form a clamp. When the optical fibers are secure, the middle of the glass portions are coupled by heat. The burner 7 and the heat-fusing connected portion 6 is used to fuse the optical fibers over the flame 8.

After the optical fibers are coupled, the slotted member 1 and the pushing member 2 are separated from each other by the slider along the guide shaft. The coupled optical fiber are thereby released by the clamp. While being heated by the flame 8, the heat-fusing connection portion 6 has a tensile force applied to it by the drawing stage 10. The heat-fusing connection 6 is drawn by the tensile force; this drawing operation is stopped when a desired split ratio is achieved. In this manner, an optical fiber coupler is manufactured.

Figure 7A:
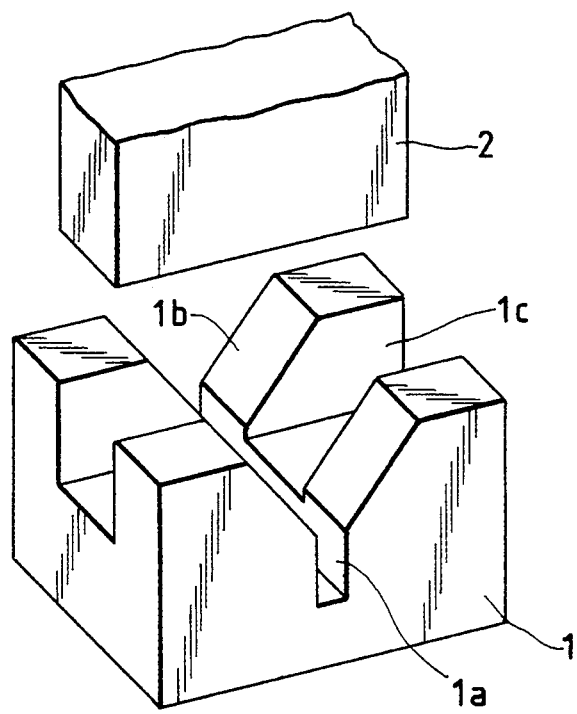
FIGS. 7A to 7C are illustrative diagrams of a clamp embodiment for optical fibers according to the invention.
Figure 7B:
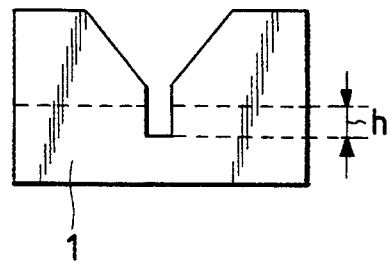
Figure 7C:
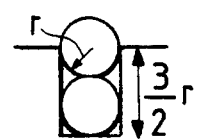

FIGS. 7A, 7B and 7C are illustrative perspective views of an embodiment of a clamp for optical fibers according to the invention. In the figures, reference numeral 1 is slotted member, 1a a slot, 1b an optical-fiber feeding portion, 1c a slot into which a pushing member is inserted, and 2 a pushing member. As shown in a perspective view of FIG. 7A, this clamp is constructed so that the pushing member 2 presses the optical fibers from the feeding portion 1b into the slot 1a of the slotted member 1. This operation clamps the optical fibers together. The pushing member 2 has a width such that it goes into the slot 1c of the slotted member.

The height of slot 1a should be at least 1.5 times greater than the diameter of the optical fibers, as shown in FIG. 7C, in order to ensure the optical fibers are fully inserted in the slot 1a. The optical fibers must be fully inserted into slot 1a because otherwise the optical fibers will not be held parallel to one another. In the case where the bottom of slot 1c is lower than that of slot 1a, it does not matter if the height of slot 1a is greater than 1.5 times the diameter of optical fibers because regardless of the slots height the diameter of optical fibers will be fully inserted into slot 1a. When the bottom of slot 1c is higher than that of the slot 1a, as shown in FIG. 7B, the height h of slot 1a from the bottom of slot 1c must be at least 1.5 times the diameter of optical fiber. In this case, the slot 1a is extended to the bottom of slot 1c. Having the bottom of slot 1c beyond that of slot 1a is advantageous because the force exerted on the optical fiber by the pushing member 2 will be uniformly distributed to the optical fiber.

The width of the slot 1a can be somewhat greater than the diameter of the optical fiber. If the optical fiber has a diameter of 125 $\mu$m, then the slot width may be selected to be approximately 130 $\mu$m. Good accuracy in the machining of the fibers and slot width provide a slot width close to 125 $\mu$m. The depth h of slot 1a, for a optical fiber of diameter d being 125 $\mu$m, is given by 1.5×d or 125 $\mu$m×1.5=187.5 $\mu$m or more. Preferably, the depth of slot 1a has a value ranging from 187.5 to 200. However, it is also possible to make the depth of slot 1a greater than twice the diameter of optical fiber, i.e., greater than 250 $\mu$m when the diameter of the optical fiber is 125 $\mu$m. If the h described with reference to FIG. 7B is greater than 187.5 $\mu$m and less than 250 $\mu$m, no problems will arise.

FIGS. 8A to 8E show two optical fibers being clamped by the clamp described in FIGS. 7A and 7B. In the figure, similar elements to those in FIG. 7A and 7B have been given the same references and the description thereof is omitted.

Figure 10A:
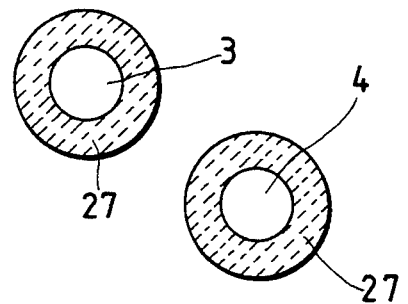
FIGS. 10A and 10B show relative position of the glass portions of the optical fibers.
Figure 10B:
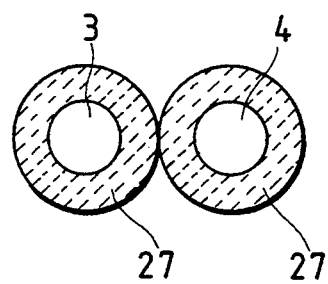

Ideally, the glass portions 3 and 4 should be in the position shown in FIG. 10B if the two optical fibers are properly aligned by the coating clamp 9 described in the reference to FIG. 6. The optical fibers will not be ideally positioned by the cover clamp 9 because of forces resulted from twisting and bending of the optical fibers themselves and because the two optical fibers are separated from each other and at irregular positions, as shown in FIG. 10A.

Figure 8A:
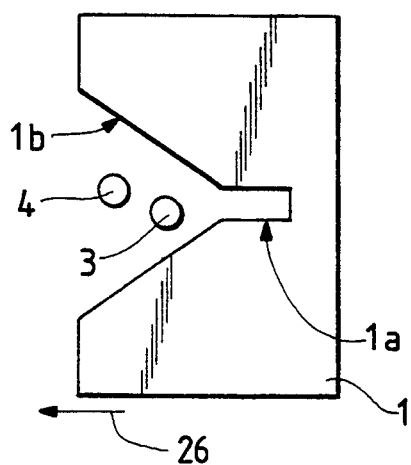
FIGS. 8A to 8E show how the clamp of FIGS. 7A to 7C operates.
Figure 8B:
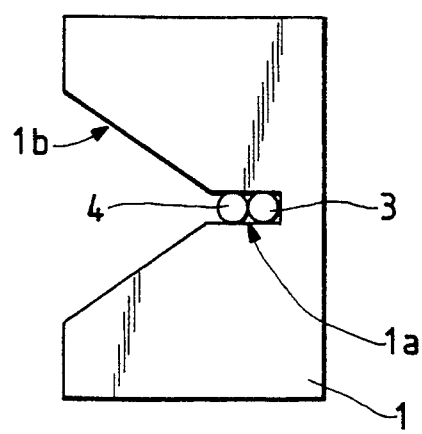
Figure 8C:
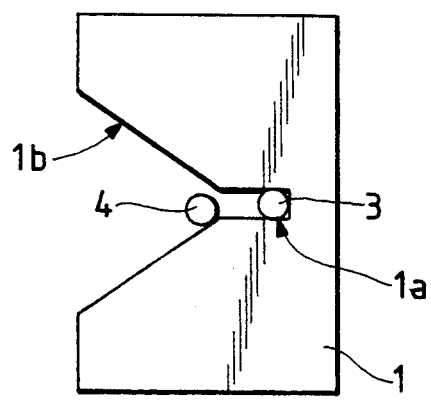
Figure 8D:
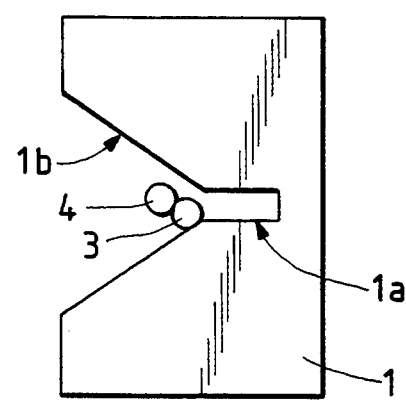
Figure 8E:
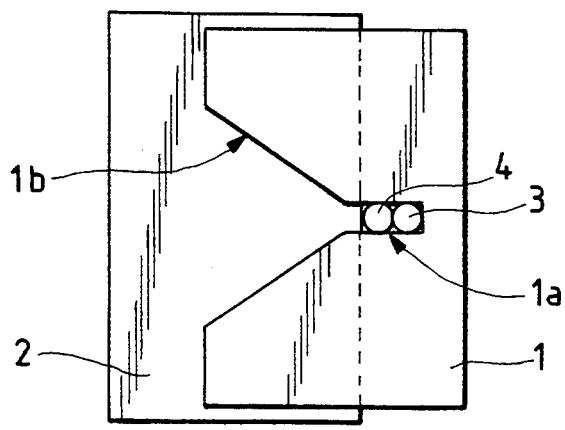

As shown in FIG. 8A, the slotted member 1 is moved toward the glass portions 3 and 4 of optical fibers in the direction of the arrow 26. If the operation is successfully carried out, the glass portions 3 and 4 are received in the slot 1a as shown in FIG. 8B. However, if one of the glass portions will not go into the slot, as shown in FIG. 8C, or both of the glass portions stay at the entrance of slot 1a, as shown in FIG. 8D, the pushing member 2 pushes the glass portions of the optical fibers into the slot 1a, as shown in FIG. 8E. Thus, two optical fibers will be completely aligned.

Figure 9A:
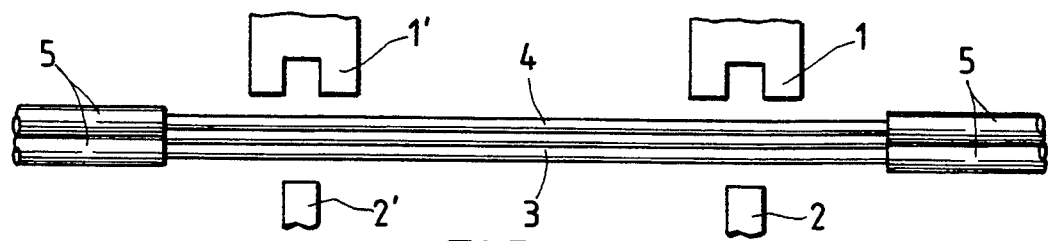
FIGS. 9A and 9B show the procedure of clamping two optical fibers for an optical fiber coupler manufacturing apparatus.
Figure 9B:
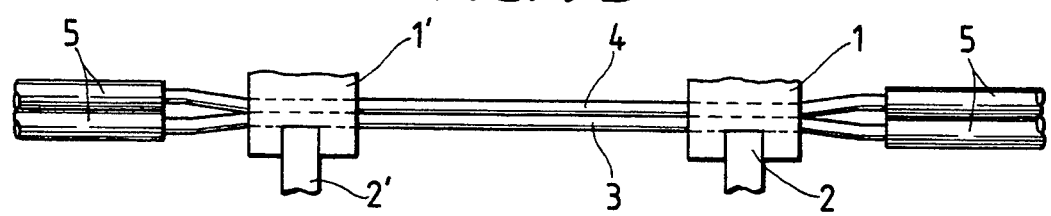

FIGS. 9A and 9B illustrate the process from a view above the apparatus. In this illustration, the two optical fibers are clamped by the optical fiber coupler manufacturing apparatus described in FIG. 6. In FIGS. 9A and 9B, references 1 and 1' are slotted members, 2 and 2' pushing members, 3 and 4 glass portions of optical fibers, and 5 and 5' coatings.

In FIG. 9A the slotted members 1 and 1' and pushing members 2 and 2' are away from each other before clamping. Before the fusing process, the slotted members 1 and 1' and the pushing members 2 and 2' move toward one another to clamp the glass portions 3 and 4 of optical fibers as described for FIGS. 8A to 8E. It is important that the two glass portions 3 and 4 be clamped symmetrically as shown in FIG. 9B. Accordingly, the slotted members 1 and 1' and the pushing members 2 and 2' push the glass portions 3 and 4 by a depth equal to the thickness of coatings of optical fibers. Care should be taken to properly position both the slotted and pushing members and to apply a proper pressing force so that the fibers are properly pushed together.

Figure 11:
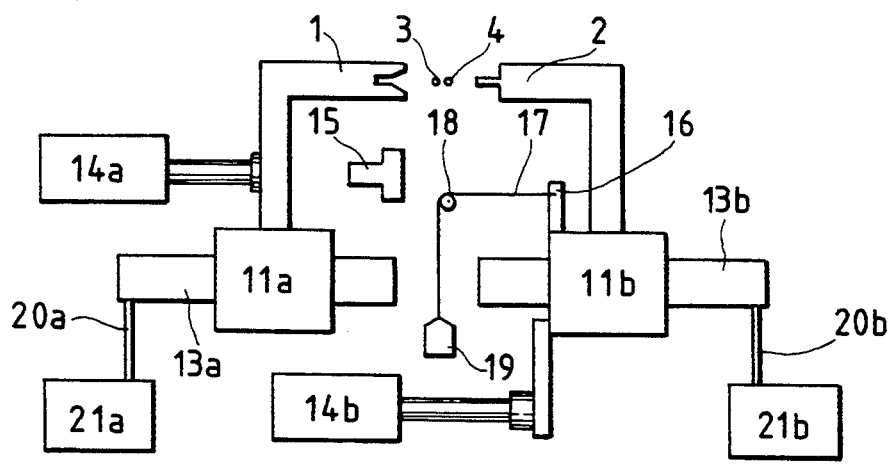
FIG. 11 shows an embodiment of a drive mechanism of a clamp for optical fibers according to the invention.

FIG. 11 is a diagram of an embodiment showing a general construction of a clamp mechanism in an optical fiber coupler manufacturing apparatus where a weight is used to drive the clamp. In the figure, 1 is slotted member, 2 a pushing member, 3 and 4 the glass portions of optical fibers, 11a and 11b sliders, 13a and 13b guide shafts, 14a and 14b air cylinders, 15 a stopper, 16 a post to which the end of a string is fixed, 17 a string, 18 a roller, 19 a weight, 20a and 20b air supplying tube, and 21a and 21b compressed air suppliers. The sliders 11a and 11b take the form of a compressed air supplier.

Figure 13:
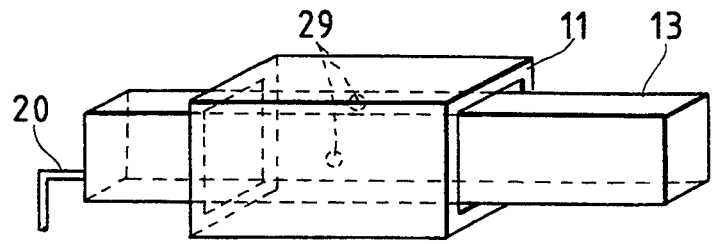
FIG. 13 shows an example of an air slider.

FIG. 13 shows one example of an air slider that can be used in the apparatus. A clearance is defined between the guide shafts 13 and the slider 11. Around the outer surface of the shaft 13, a plurality of jet holes 29 are provided which communicate with the air supplying tube 20 mounted at one of the guide shaft 13. When compressed air is introduced from the air supply tube into the guide shaft 13, the air pressure causes the slider 11 to float along the guide shaft 13. The slider 11 is therefore able to move with a very small friction and the clamp mounted on the slider 11 can be moved by a small force.

The operation of the clamp mechanism in FIG. 11 will now be described. When the fibers are not being clamped, the slotted member 1 and the pushing member 2 are separated from each other as shown in the figure. The glass portions 3 and 4 of the optical fibers are set between the slotted member and the pushing member. The slotted member 1 is stopped by the stopper 15. The weight 19 then exerts a force on the post 16 via the roller 18 and the string 17 and therefore moves the pushing member 2. Before the pushing member 2 moves, the pressing force of the air cylinder against the slider 11b is removed. The glass portions 3 and 4 of optical fibers are pushed together by the weight 19.

The pushing member needs to continually push the optical fibers. When the pushing member 2 moves via an air slider, the pushing member 2 continues to push the optical fibers after the air supply is stopped because of the weight 19. The use of the weight saves air and imposes no problem if the pushing member yaws.

It is good practice in the present invention to reduce the force needed by the pushing member to push the optical fibers to as low as possible thereby preventing damage to the optical fibers. Consequently, the pushing member preferably takes the form of an air floating type bearing described above.

Figure 12A:
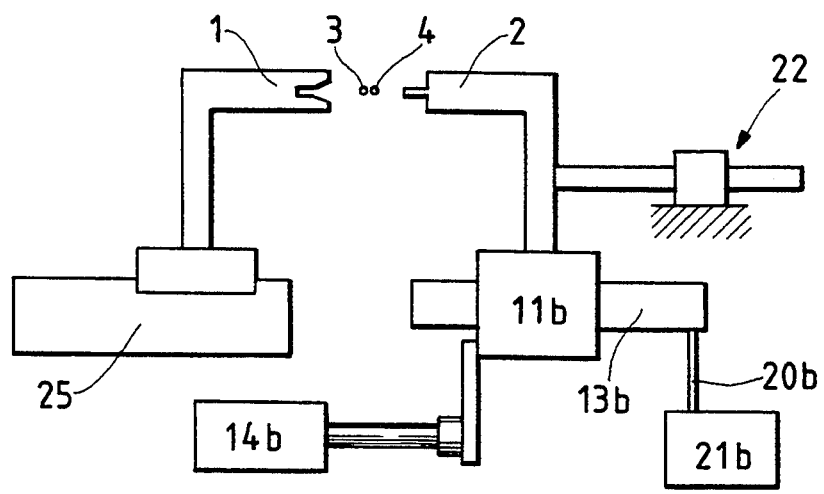
FIGS. 12A and 12B show embodiments of clamps for an optical fiber clamp according to the invention.

FIG. 12A shows a general construction of another embodiment of a clamp mechanism for an optical fiber coupler manufacturing apparatus. In the figure, elements similar to those in FIG. 11 have been given the same reference numbers, and their description has been omitted. Reference numeral 22 denotes a magnet mechanism, and 25 is an automatic stage. The slotted member 1 plays in important role in positioning. The pushing member 2 is driven by an electromagnet 22.

Figure 12B:
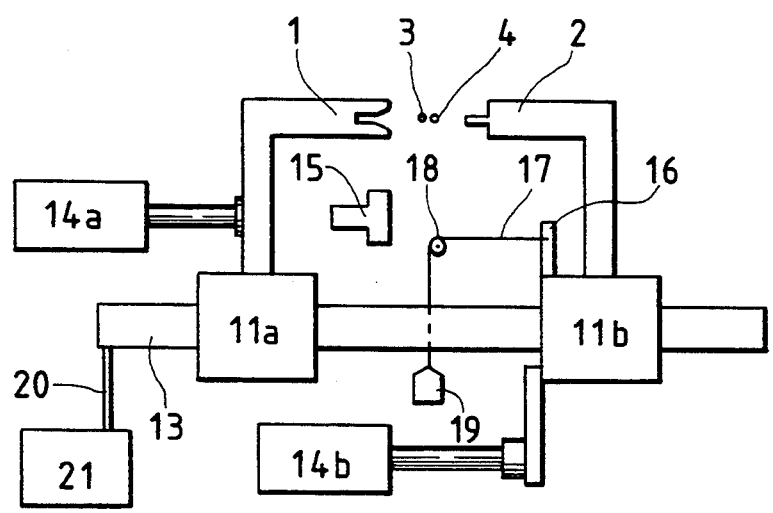

FIG. 12B shows a general construction of still another embodiment of a clamp mechanism for an optical fiber coupler manufacturing apparatus. In the figure, elements similar to those in FIG. 11 have been given the same references, and their description has been omitted. In this embodiment, the two guide shafts 13a and 13B have been replaced by a common guide shaft 13. This facilitates the orientation of the slotted member 1 relative to the pushing member 2.

The method of moving the clamp is not limited to the above-described embodiments. Other known linear bearings may also be used. If the moving mechanisms have larger diameters, other bearings may be used in place of the linear bearings.

Figure 14:
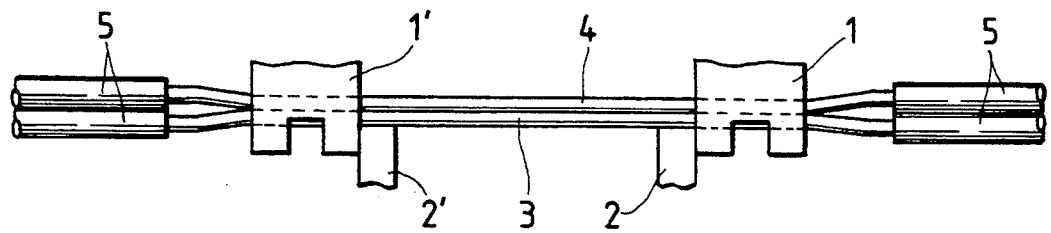
FIG. 14 shows a top view of an embodiment of an optical fiber clamp according to the invention.

In FIG. 14, the axial direction of the optical fibers in the slotted members 1 and 1' are spaced away from the pushing members 2 and 2'. In this case, larger shearing forces are exerted on the optical fibers so that the optical fibers tend to fracture. When using this configuration, care should be exercised when applying a pressing force to the fibers.

Figure 15:
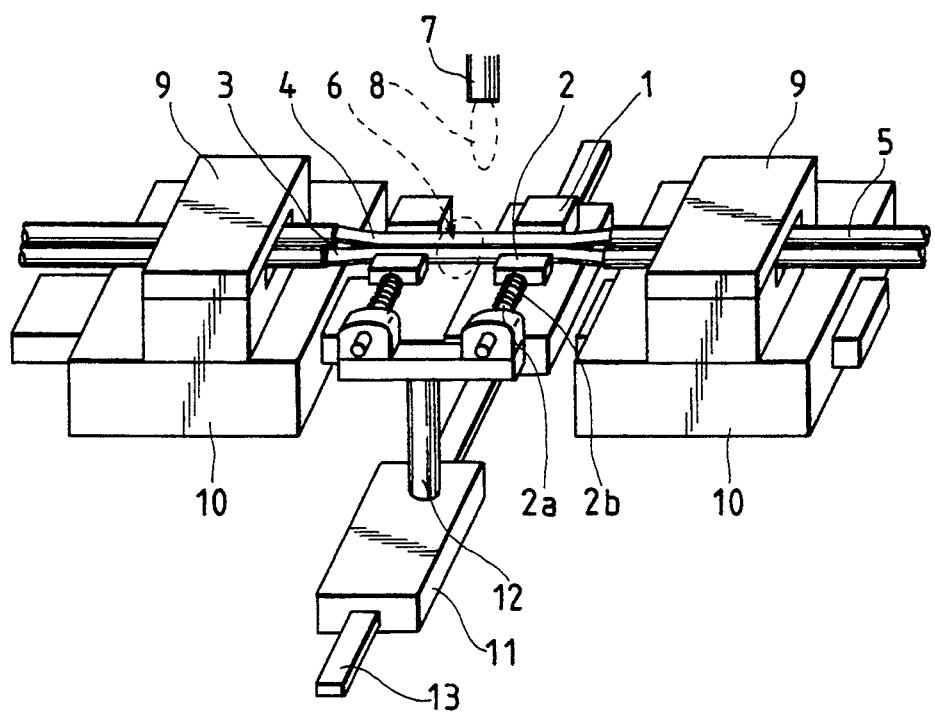
FIG. 15 shows a general construction of another embodiment of an optical fiber coupler manufacturing apparatus according to the invention.

FIG. 15 is a general perspective view of an optical fiber coupler manufacturing apparatus showing another basic embodiment of the invention. Elements similar to those in FIG. 6 have been given the same references, and their description has been omitted. The pushing member 2 is mounted at the tip end of a movable shaft 2a so that some movement is allowed. The pushing member is urged by a spring 2b against the slotted member 1. A construction like a ball-and-socket joint may be used to mount the pushing member 2 on the shaft 2a so that the pushing member 2 may be freely positioned relative to the movable shaft 2a, or it can be fixed to the pushing member. The pushing member 2 may be loosely mounted on the movable shaft. The movable shaft 2a may be mounted loosely to the stand 12. A clamp constructed of the slotted member 1 and the pushing member 2 and its operation are the same as those used in the embodiment of FIG. 6, and therefore their description has been omitted.

To clamp the optical fibers, the pushing members 2 and 2' are each urged by the spring 2b. Both members 2 and 2' have freedom at their distal end portions. As shown in FIG. 16A, even if the pushing members 2 and 2' are advanced somewhat obliquely relative to the slotted members 1 and 1', the freedom allows the pushing members 2 and 2' to be properly aligned with the slot, as shown in FIG. 16B, and effectively push the optical fibers 3 and 4.

FIG. 17 is a diagram of an embodiment showing a general construction of a clamp mechanism of an optical fiber coupler manufacturing apparatus. In this figure, the reference numbers correspond to those in FIG. 6 and their descriptions have been omitted. As compared to FIG. 12b, FIG. 17 has two stoppers 15a and 15b, two air supplying tubes 20a and 20b, two compressed suppliers 21a and 21b and two weights 22a and 22b for urging the clamp to an open position. The sliders 11a and 11b take the form of an air slider as described above.

The operation of the clamp mechanism in FIG. 17 is similar to that described for FIG. 9A, 9B and 11. The slotted member 1 is stopped by stopper 15a. As in FIGS. 9A and 9B, the slotted member is preferably stopped at a position where the slot pushes the glass portion 3 by a distance equal to the thickness of the cover. The pushing member 2 is driven by an air cylinder 14b and is restrained at its stop position by stopper 15b. The pushing member 2 is supported by a movable shaft 2a and is also urged by the spring 2b. This configuration, pushes the glass portions 3 and 4 of optical fibers together.

The pushing member 2, is required to continually push the optical fibers. While the optical fibers are held together by the slotted member and the pushing member, the glass portions of optical fibers are melted together as described above. The clamp is opened by air cylinders 14a and 14b moving in opposite direction. The tensile force is caused by weights 22a and 22b separating the slotted member 1 and the pushing member 2, so that the apparatus goes into drawing process.

The means used to separate the slotted member 1 and the pushing member 2 is not limited to a weight. Another suitable drive mechanism is an air cylinder. The slotted member 1 and the pushing member 2 can also be placed on a beveled surface so that they are separated by sliding down the beveled surface due to their weight.

It is good practice to reduce the force needed to push the optical fibers together to prevent damage to the optical fibers. From this point of view, the pushing member preferably takes form of an air floating type bearing. However, a mechanical slider may also be used.

It is more reasonable to have the slotted member 1 fixed and the pushing member 2 urged by a spring. However, the pushing member 2 may be fixed at a position and the slotted member 1 may be urged by a spring. On the other hand, both members may be urged by springs, this configuration makes it difficult to align the optical fibers in exact symmetry.

FIG. 18 shows a general construction of another embodiment of a clamp mechanism. In the figure, elements similar to those in FIG. 17 have been given the same references, and their description has been omitted. Reference numerals 16a and 16b are automatic stages. In this embodiment, the slotted member 1 and the pushing member 2 are driven and positioned by the automatic stages. The position of the two members is critical because it determines the characteristics of the optical couplers. Therefore, the automatic stage improves the accuracy of the produced couplers.

Figure 19:
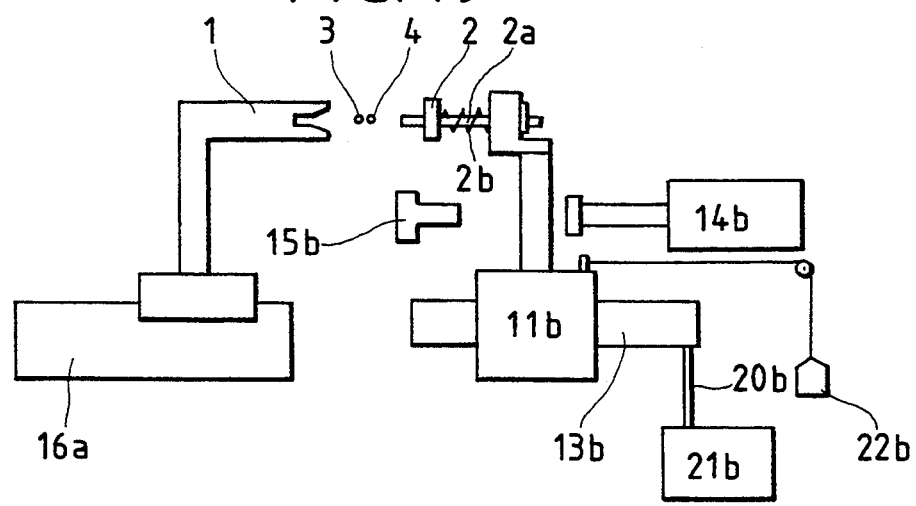
FIG. 19 shows still another embodiment of a drive mechanism for an optical fiber clamp according to the invention.

FIG. 19 shows a general construction of still another embodiment of a clamp mechanism. In the figure, elements similar to those in FIG. 17 have been given the same references, and their description has been omitted. In this embodiment, the slotted member 1 is driven and positioned by the automatic stage 16a. The pushing member 2 is driven by an air cylinder 14b as in FIG. 17, and is positioned by the stopper 15b.

Figure 20A:
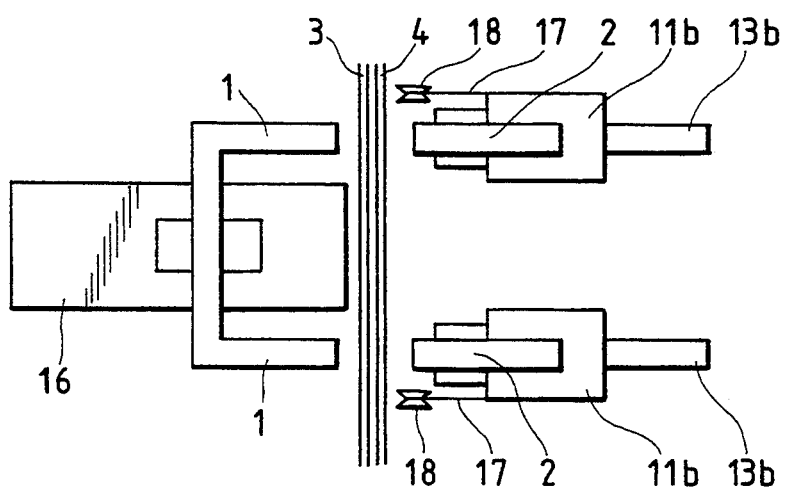
FIG. 20A and 20B show an embodiment where a weight is used in the clamp mechanism.
Figure 20B:
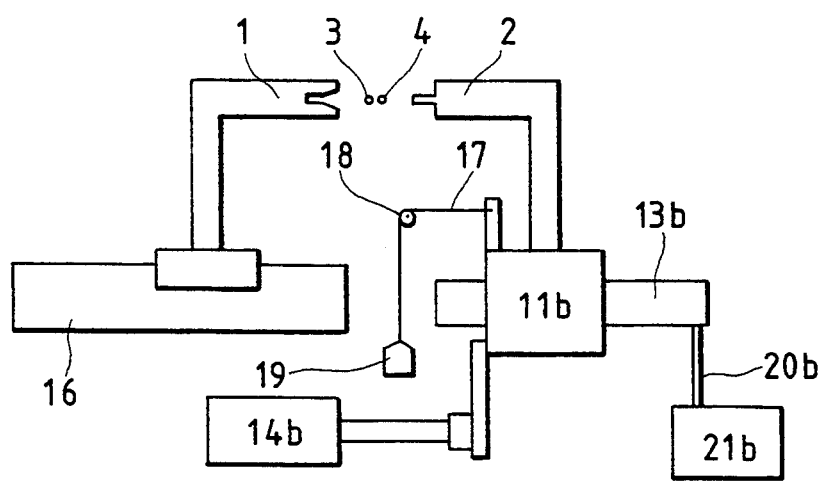

FIGS. 20A and 20B show the general construction of an embodiment where a weight is used in the clamp mechanism. FIG. 20A is a top view, and FIG. 20B is a side view. In the figures, elements similar to those in FIG. 17 have been given the same references, and their description has been omitted. Reference numeral 17 denotes a string, 18 a roller, and 19 a weight. The slotted member 1 is driven by an automatic stage 16a. The weight 19 exerts a force on the slider 11b through the string 17 and the roller 18 and moves the pushing member 2. The pushing member 2 is freely positioned relative to the slider 11b. Prior to movement, any force on the air cylinder against the slider 11b is removed. The glass portions 3 and 4 of optical fibers are pushed together by the weight 19.

The method of moving the clamp is not limited to the above-described embodiments. Other suitable urging means like an electromagnet can also be used. Known linear bearings may also be used for the movable stage and other type of bearings may be used if the moving mechanism has larger diameters.

Figure 21:
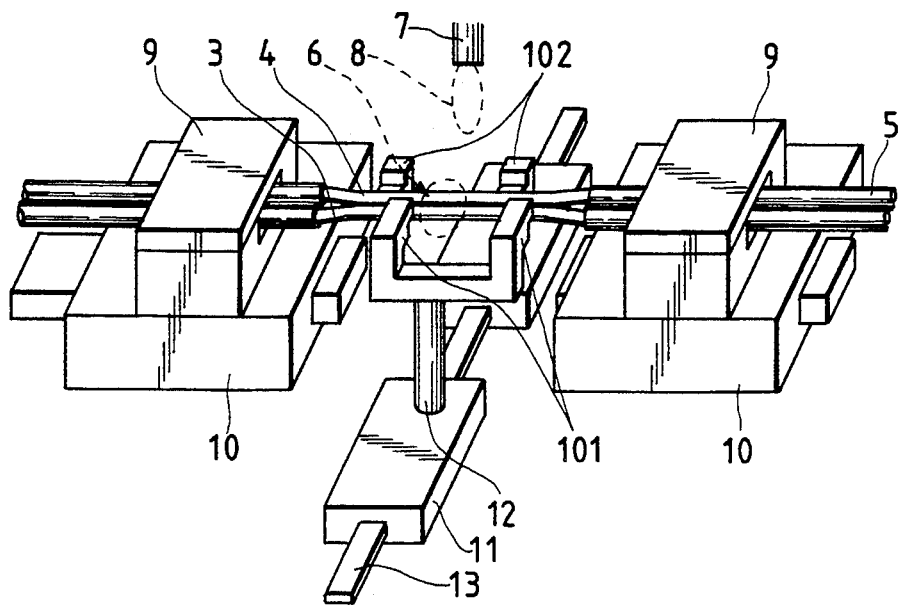
FIG. 21 shows a further embodiment of general construction for an optical fiber coupler manufacturing apparatus according to the invention.

FIG. 21 is a general perspective view of an optical fiber coupler manufacturing apparatus showing a further basic embodiment of the invention. In the figure, references numeral 101 denotes a first clamp and 102 is a second clamp. Elements similar to those in the preceding embodiments have been given the same references, and their description has been omitted.

The first clamp 101 and the second clamp 102 are substantially L-shaped portions. They clamp together the glass portions 3 and 4 of optical fibers stripped of their coatings. The clamping operation will be described later in detail.

When manufacturing optical fiber couplers, two or more fibers with part of their coatings stripped off are clamped by the coating clamp 9 on the drawing stage 10. The coating clamp 9 is placed on the drawing stage 10 so that optical fibers can be drawn in their axial direction. The coating clamps hold the two fibers laterally. The glass portions 3 and 4 are then aligned by the first and second clamps 101 and 102 so that they are parallel. The glass portions are heated at the heat-fusing connection portion 6 over the flame of the burner 7.

After the fusing, the first clamp 101 and the second clamp 102 move away from each other. Then, while being heated by the flame 8, the heat-fusing connected portion 6 has a tensile force applied to it by the drawing stage 10. The heat-fusing connected portion 6 is drawn by the tensile force, and the drawing operation is stopped when the desired split ratio is achieved. In this manner, optical fiber couplers are manufactured.

To put the glass portions together, the first clamp 101 and the second clamp 102 can be supported by an air slider. In this manner, the clamp is moved by only a small force. The air supply is then shut off to properly position the clamp. As shown in FIGS. 26 to 28, it is preferred that the first and the second clamp 102 push the glass portions of optical fibers by the same amount. Either a weight or an electromagnet should be used to urge the first clamp 101 and the second clamp 102 by the small force required.

The first clamp 101 and the second clamp 102 are positioned so that they clamp the glass portions 3 and 4 on both sides. Both clamps 101 and 102 may be supported by moving shafts that are independent of each other. In doing so, the glass portions may be pushed at two different positions and the position of each clamp may be adjusted individually.

FIGS. 22A to 22D illustrate the operation of an embodiment of a clamp for optical fibers according to the present invention. In the figure, reference numeral 101 is a first clamp, 101a an optical fiber receiving portion, 102 a second clamp, 102a an optical fiber receiving portion, and 3 and 4 glass portions of optical fibers. The first and second clamps 101 and 102 are substantially L-shaped. In this embodiment, the first clamp supports the glass portions from the left and under side while the second clamp works from the right and upper sides.

Figure 22A:
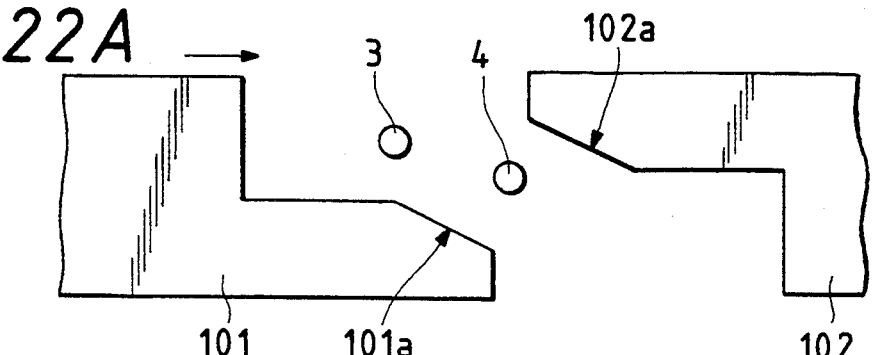
FIG. 22A to 22D are illustrative diagrams for an embodiment of a clamp used in the optical fiber coupler manufacturing apparatus according to the invention.

As shown in FIG. 22A, the glass portions 3 and 4 are positioned between the two separated clamps. To begin, the first clamp 101 moves in the direction of arrow. The glass portions 3 and 4 are guided into the L-shaped portion through the receiving portion 101a.

Figure 22B:
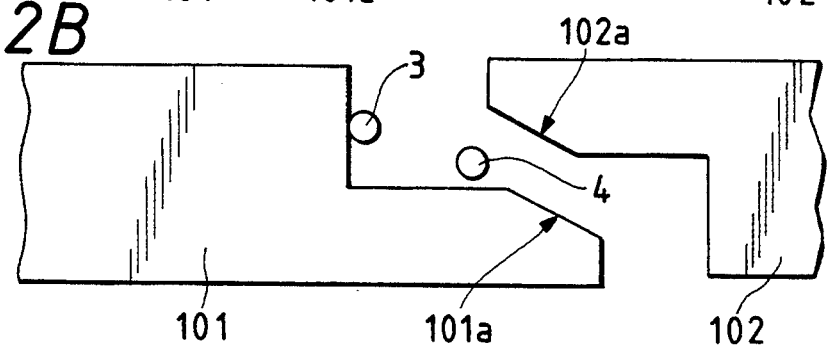

As shown in FIG. 22B, the first clamp 101 stops at a predetermined position. This position is equal to the thickness of coating stripped from the glass portion of the optical fiber as described in FIGS. 26 and 28.

Figure 22C:
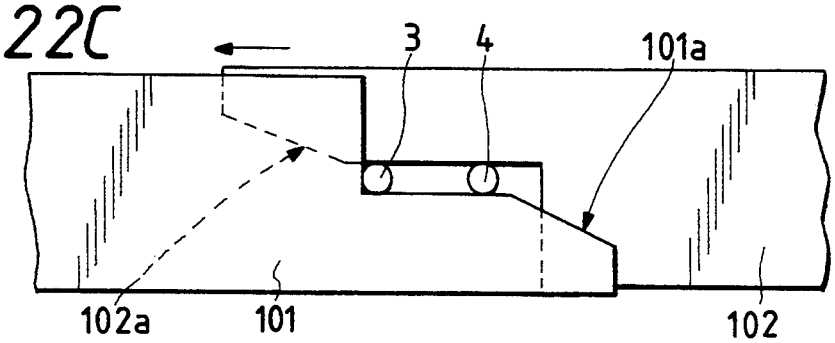
Figure 22D:
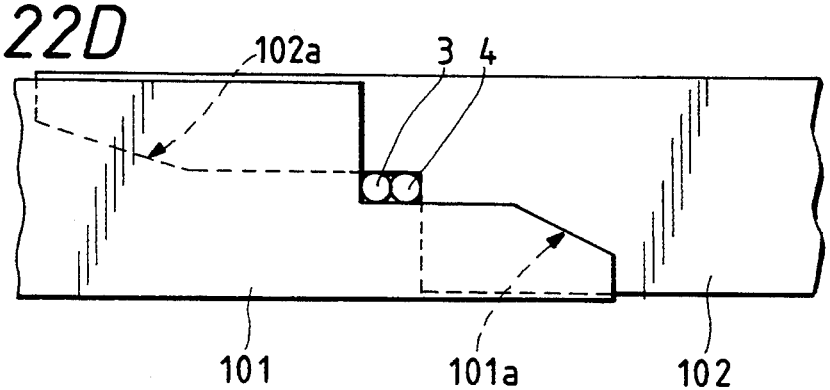

As shown in FIG. 22C, the second clamp 102 is advanced in the direction of arrow. The glass portions 3 and 4 are guided downward by the receiving portion 102a and are aligned on the first clamp 101. The second clamp 102 is advanced so that the glass portions 3 and 4 are pressed together as shown in FIG. 22D.

Figure 23A:
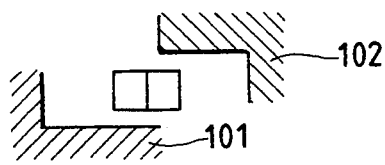
FIGS. 23A to 23E show how the clamp in FIG. 22 operates.
Figure 23B:
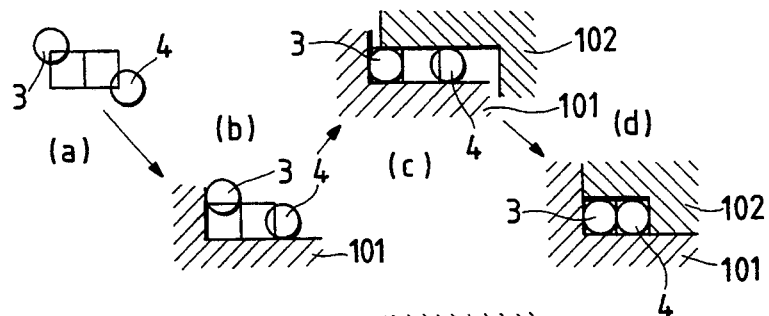
Figure 23C:
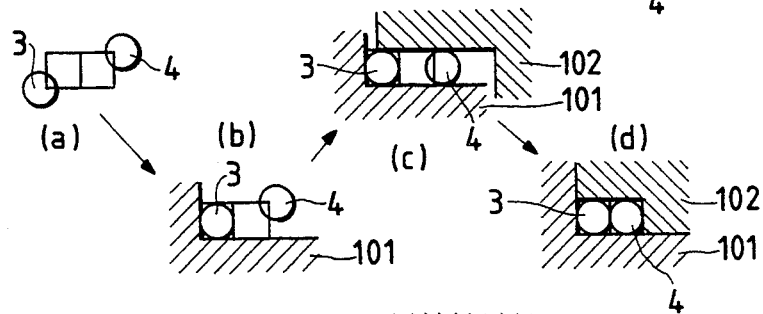
Figure 23D:
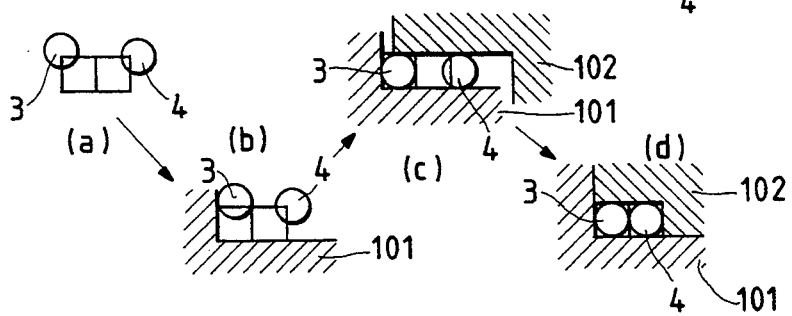
Figure 23E:
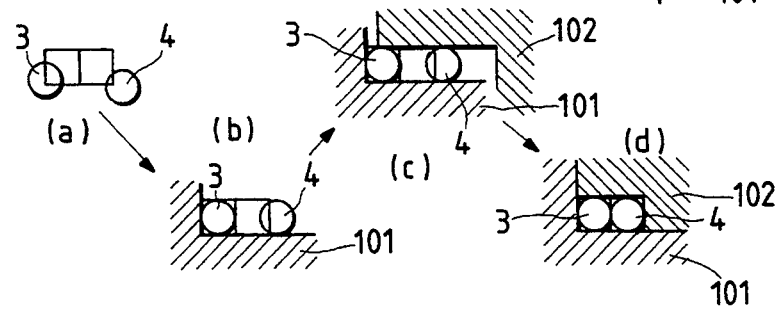

FIGS. 23A to 23E illustrate diagrams of the clamping operation FIG. 22. In FIG. 23A, the two adjacent squares indicate the positions where the glass portions are to be set. Reference numerals 101 and 102 indicate the walls of the first and second clamps. The clamps are L-shaped. The wall of the first clamp pushes the glass portions from left side and under side while the wall of second clamp pushes from the right side and the upper side. FIGS. 23B to 23E show cases where the glass portions are positioned differently when not clamped. Figure (a) of FIGS. 23B through 23E shows the positions of glass portions 3 and 4 when not clamped and corresponds to FIG. 22A. Figure (b) corresponds to the positions of glass portions in FIG. 22B, Figure (c) to the position in FIG. 22C and Figure (d) to the position in FIG. 22D. In Figure (d) of FIGS. 23B to 23E the glass portions 3 and 4 are properly set.

Figure 24A:
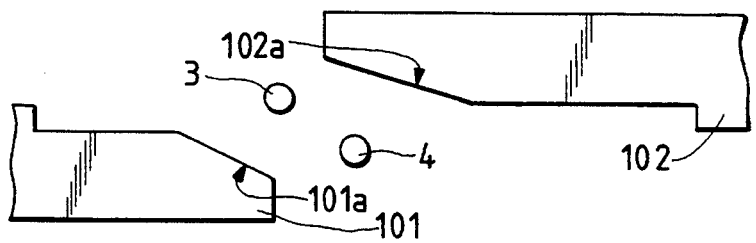
FIGS. 24A to 24C are illustrative diagrams for another embodiment of a clamp used in the optical fiber coupler manufacturing apparatus according to the invention.
Figure 24B:
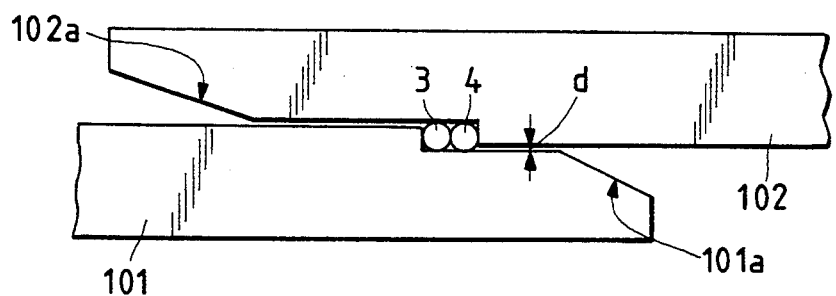
Figure 24C:
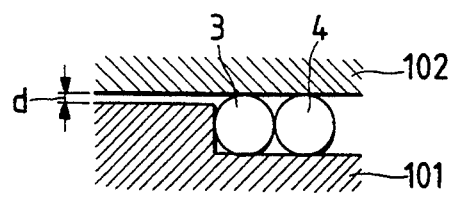

FIGS. 24A to 24C are illustrative diagrams of another embodiment of an L-shaped clamp. In these figures, elements similar to those in FIG. 22 have been given the same references, and their description is omitted. FIG. 24A shows the clamp when clamping operation has not started, and FIG. 24B when clamping operation is complete. As shown in FIG. 24C, when the diameter of glass portion of the optical fibers is 250 $\mu$m, the clearance d between the two clamps needs to be less than half the radius, i.e., 62.5 $\mu$m. The clearance d is actually less than 30 $\mu$m to allow for a margin.

For the clamp in FIG. 22, the first clamp 101 and the second clamp 102 should be axially separated from each other. However, in FIG. 24 the clamps can be positioned at the same longitudinal position. These respective positions will prevent a shearing force from being exerted on the glass portions.

Figure 25A:
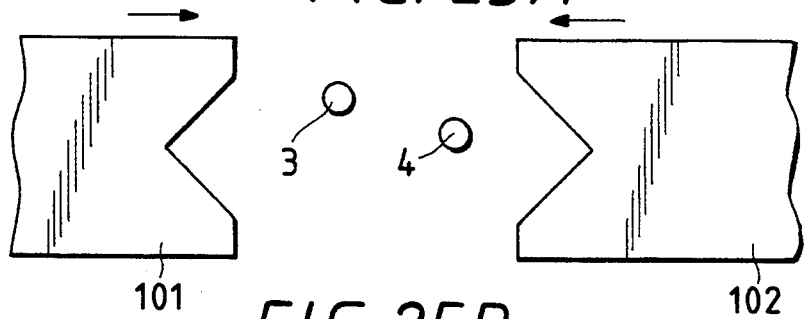
FIGS. 25A and 25B are illustrative diagrams of an embodiment of a clamp used in the optical fiber coupler manufacturing apparatus according to the invention.
Figure 25B:
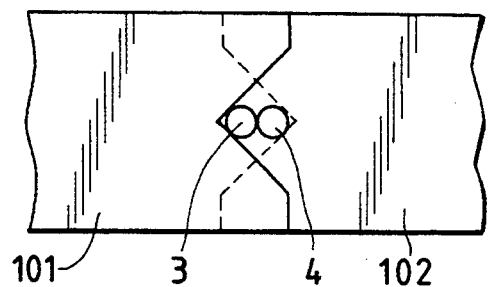

FIGS. 25A and 25B show an embodiment of the first clamp 101 and the second clamp where the L-shaped portion is rotated 45 degrees. In FIG. 25A the clamp is inactive and in FIG. 25B the glass portions are clamped together. For this embodiment, the aperture of the clamp may be wide. Unlike the clamp disclosed in Japanese Patent Preliminary Publication No. 64-80913, the glass portions are not inserted into the slot but are rather pushed from both sides by the two L-shaped portions 101 and 102. The operation of the clamp provides for secure alignment of the two fibers.

FIGS. 26 to 28 are top views of the apparatus showing the positions of the clamp when not activated and when activated. In each figure, a reference numerals 101 and 101' denote the first clamp, 102 and 102' the second clamp, 3 and 4 the glass portions of optical fibers, and 5 is the coating.

Figure 26A:
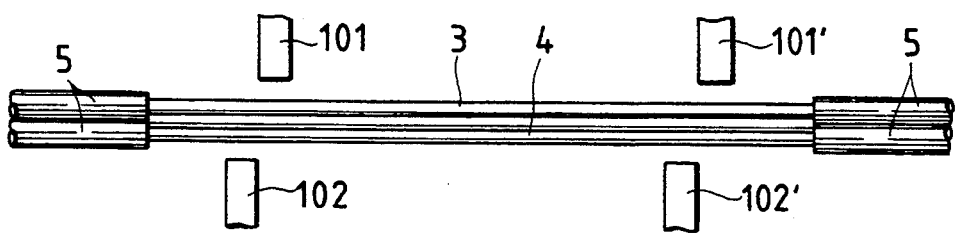
FIGS. 26A and 26B are top views of an example for arrangement of a clamp according to the invention.
Figure 26B:
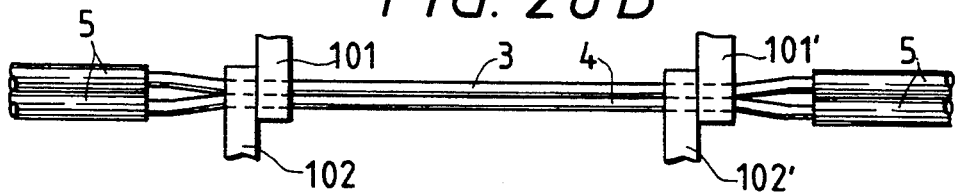

FIGS. 26A and 26B show an embodiment where the first clamp 101 and 101' are spaced apart relative to the second clamps 102 and 102' in the longitudinal direction of the glass portions 3 and 4. Before clamping, as shown in FIG. 26A, the first clamps 101 and 101' and the second clamps 102 and 102' are spaced apart. Prior to the fusing process, the first clamps 101 and 101' and the second clamps 102 and 102' move to clamp the glass portions 3 and 4 of optical fibers. In FIG. 26B, the glass portions 3 and 4 are shown clamped together symmetrically. The first clamps 101 and 101' and the second clamps 102 and 102' push the glass portions 3 and 4 a distance equal to the thickness of the coating of optical fibers. Care should be exercised so that the clamps are properly positioned and they properly push the fibers.

Figure 29A:
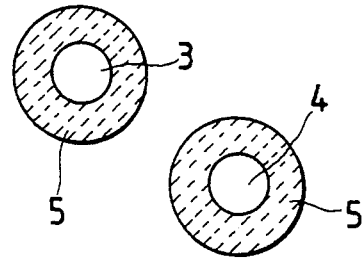
FIGS. 29A and 29B are illustrative diagrams showing relative positions of the glass portions of optical fibers.
Figure 29B:
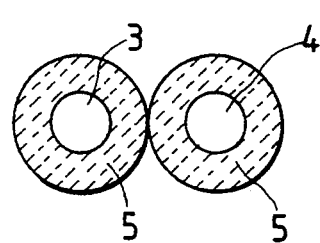

If the two optical fibers are properly aligned by the coating clamp 9 as described in FIG. 21, the glass portions 3 and 4 are ideally positioned as shown in FIG. 29B. Due to forces caused by the twisting and bending of the optical fibers, the coating 5 cannot be put together by the coating clamp 9 in an ideal form. As shown in FIG. 29A, two optical fibers are actually apart from one another and at irregular positions. In the present invention, the two L-shaped portions 101 and 102 push the optical fibers together from both sides so that the two fibers are reliably put together.

Figure 27A:
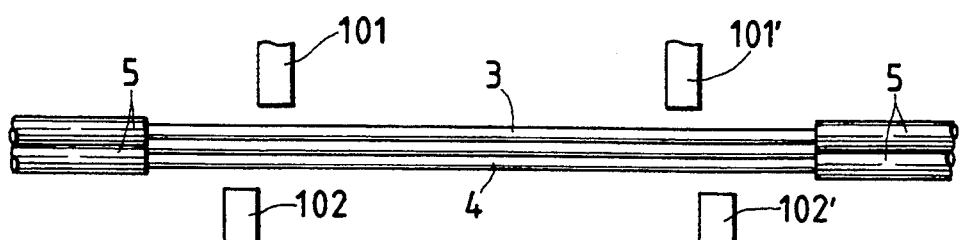
FIGS. 27A and 27B are top views of another example for arrangement of a clamp according to the invention.
Figure 27B:
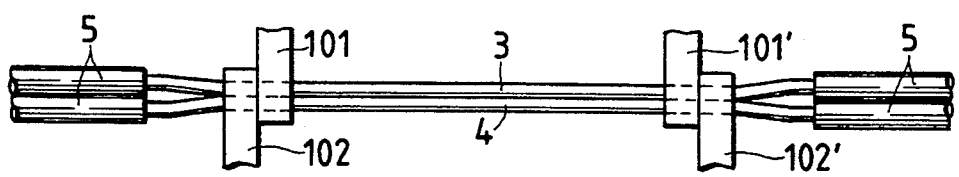

FIGS. 27A and 27B shown an embodiment where the first clamps 101 and 101' are spaced apart in opposite longitudinal directions of the glass portions 3 and 4 relative to the second clamps 102 and 102'. In other words, the first clamps 101 and 101' are on the inside while the second clamps 102 and 102' are on the outside.

FIG. 27A shows the clamps when they are not active, while FIG. 27B shows the clamps when they are clamping. Clamping is effectuated as it is shown in FIG. 26. This embodiment can also be configured with the first clamps 101 and 101' on the outside and the second clamps 102 and 102' on the inside.

Figure 28A:
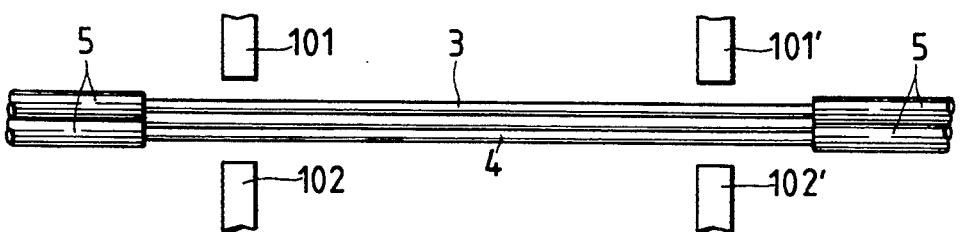
FIGS. 28A and 28B are top views of another example for arrangement of a clamp according to the invention.
Figure 28B:
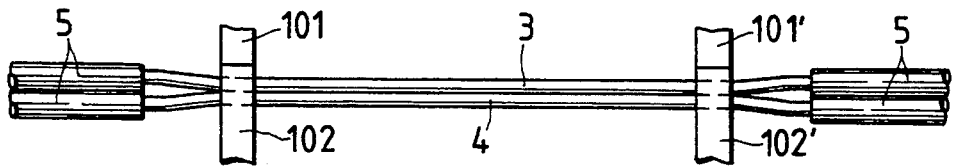

FIGS. 28A and 28B show an embodiment where the first clamps 101 and 101' and the second clamps 102 and 102' are at the same position in the axial direction of the glass portions 3 and 4. FIG. 28A shows the clamps when they are not active and FIG. 28B shows them when they are clamping. In this embodiment, the clamp described for FIG. 24 is used.

With the embodiments, shown in FIGS. 26 to 28, it is critical that the glass portions 3 and 4 of the optical fibers are set in vertically symmetrical positions. It is also important that the first clamps 101 and 101' and the second clamps 102 and 102' push the optical fibers by a distance equal to the thickness of the coating. The clamps are set to achieve this purpose. The first clamps 101 and 101' and the second clamps 102 and 102' push the glass portions 3 and 4 by some stable urging force such as a compressive spring, tensile force of a weight, or electromagnet.

Figure 30:
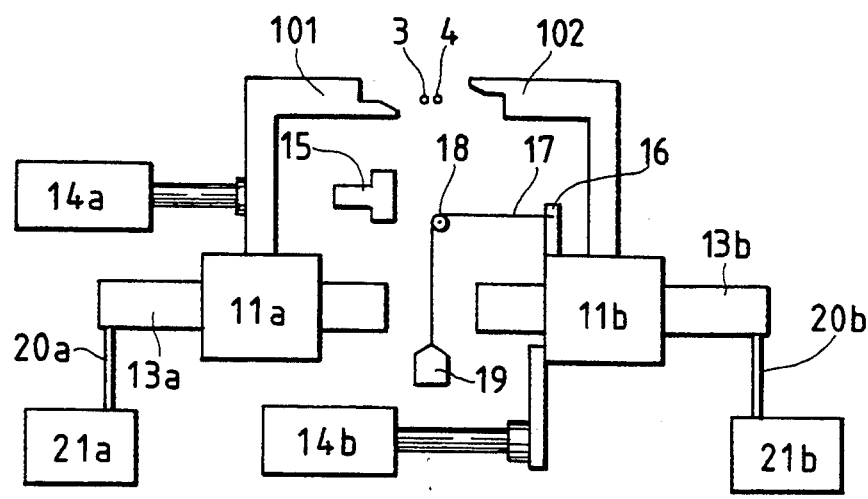
FIG. 30 is an illustrative diagram of an embodiment of a drive mechanism for a clamp in an optical fiber couple manufacturing apparatus according to the invention.

FIG. 30 shows a general construction of a clamp mechanism used in an optical fiber coupler manufacturing apparatus. It illustrates an embodiment where an air cylinder is used on one side and a weight on the other side to drive the clamp. In the figure, reference numeral 101 is a first clamp, 102 a second clamp, 3 and 4 glass portions of optical fibers, 11a and 11b sliders, 13a and 13b guide shafts, 14a and 14b air cylinders, 15 a stopper, 16 fixing post for a string, 16 a string, 18 a roller, 19 a weight, 20a and 20b air supplying tubes, and 21a and 21b compressed air supplier. The sliders 11a and 11b can take the form of an air slider.

The operation of the clamp mechanism in FIG. 30 begin when the first clamp 101 and the second clamp 102 are separated so that they can receive the glass portions 3 and 4 of optical fibers. The first clamp 101 is pushed by the air cylinder 14a and thereby places the glass portions 3 and 4 on the horizontal portion of the L-shaped clamp. The movement of first clamp 101 is stopped by the stopper 15. The weight 19 through the post 16, the roller 18, and the string 17 moves the second clamp 102. Prior to the movement of the second clamp 102, the slider 11b is freed from the force exerted on it by the air cylinder 14b.

When using a clamp according to the present invention, the pressing force of the second clamp should be reduced so that the optical fibers are not damaged. From this point of view, the second clamp is best supported by an air floating type bearing like an air slider. An example of an air slider is shown in FIG. 13.

Figure 31:
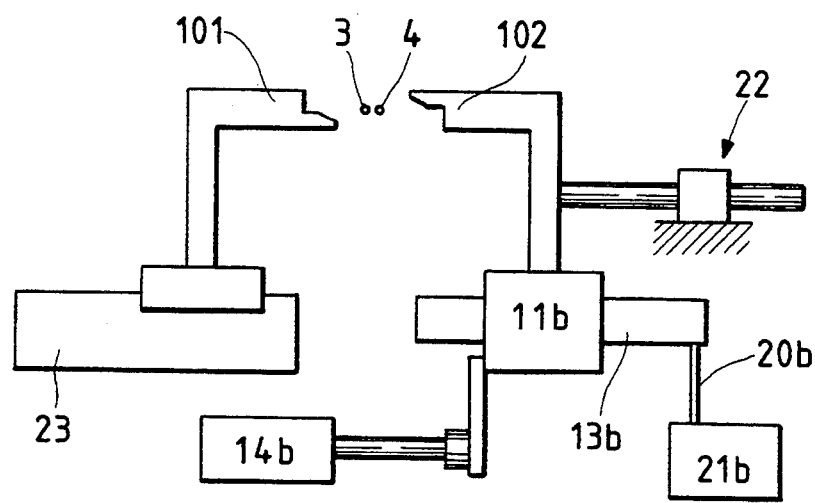
FIG. 31 is an illustrative diagram of an embodiment of a drive mechanism for a clamp in an optical fiber coupler manufacturing apparatus according to the invention.

FIG. 31 shows a general construction of another embodiment of a clamp mechanism for an optical fiber coupler manufacturing apparatus. In this figure, elements similar to those in FIG. 30 have been given the same references, and their description has been omitted. Reference numeral 22 denotes a magnet mechanism like an electromagnet, and 23 is an automatic stage. The first clamp 101 plays an important role in positioning, so an automatic stage 23 is used. The second clamp 102 may be driven by a magnet mechanism 22.

Figure 32:
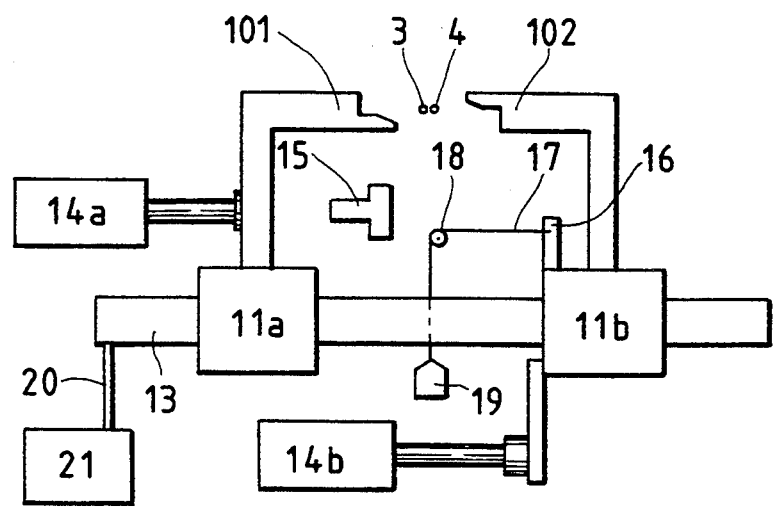
FIG. 32 is an illustrative diagram of an embodiment of a drive mechanism for a clamp in an optical fiber coupler manufacturing apparatus according to the invention.

FIG. 32 shows a general construction of still another embodiment of a clamp mechanism for an optical fiber coupler manufacturing apparatus. In the figure, elements similar to those in FIG. 30 have been given the same references, and their description has been omitted. In this embodiment, the two guide shafts 13a and 13b in FIG. 30 have been replaced by a common guide shaft 13. This facilitates the positioning of the first clamp 101 in its relative position to the second clamp 102.

Figure 33:
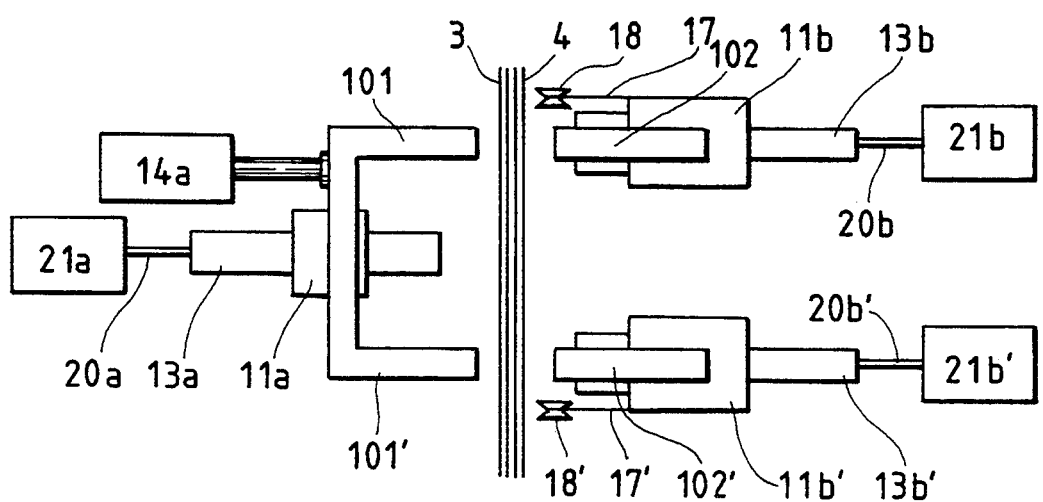
FIG. 33 is an illustrative diagram of an embodiment of a drive mechanism for a clamp with optical fiber coupler manufacturing apparatus according to the invention.

FIG. 33 shows yet another embodiment of clamp driving mechanism and illustrates a general construction of a clamp mechanism used in an optical fiber coupler manufacturing apparatus. In the figure, elements similar to those in FIG. 30 have been given the same references, and their description has been omitted. FIG. 33 is a top view and shows the dual parts for the first clamps and the second clamps. One of the dual parts is shown with the same reference numerals as in FIG. 30 and the other with "'". In this embodiment, the second clamps 102 and 102' are guided by independent guide shafts and are pushed independently. The position of each tip end may be adjusted individually. The first clamps 101 and 101' are shown with only one drive shaft. However, they may each have an individual drive shaft.

The method of moving the clamps is not limited to the above-described embodiment, and known linear bearings may be used. If the moving mechanism has a larger diameter, then the bearings need not be a linear bearing.

Figure 1:
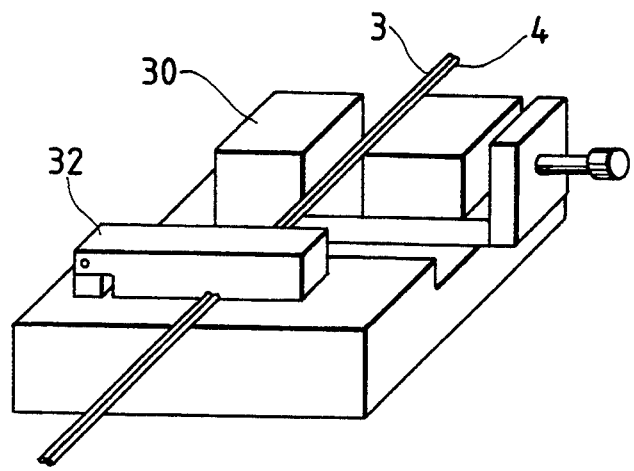
FIG. 1 is a perspective view of a conventional apparatus.
Figure 2:
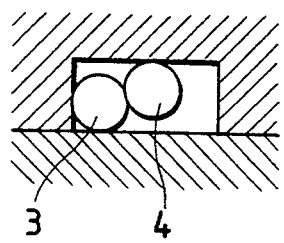
FIG. 2 is an illustrative diagram of how the clamp in FIG. 1 operates.
Figure 3:
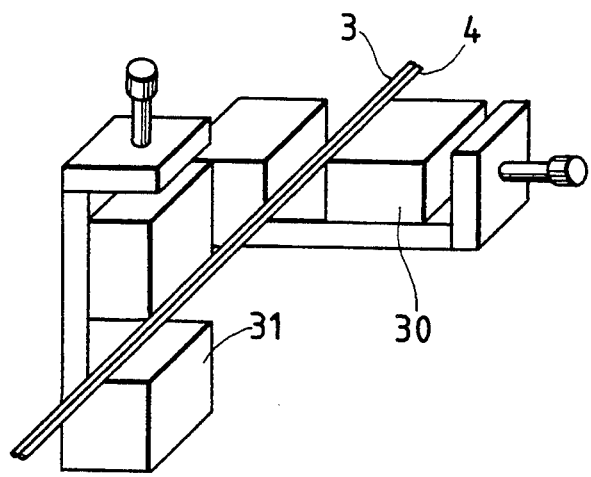
FIG. 3 is a perspective view of another conventional clamp.
Figure 4A:
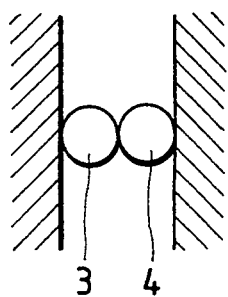
FIGS. 4A to 4D are illustrative diagrams of how the clamp in FIG. 3 operates.
Figure 4B:
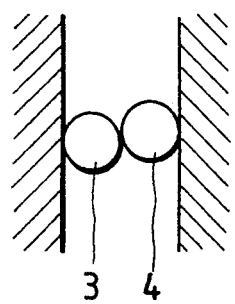
Figure 4C:
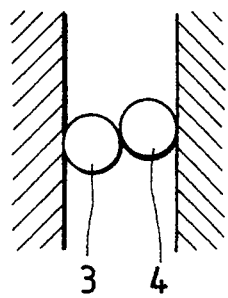
Figure 4D:
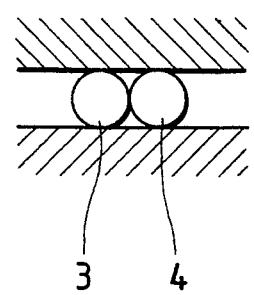
Figure 5A:
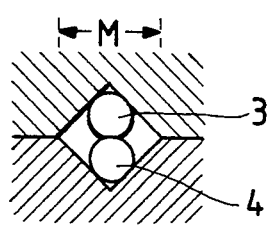
FIGS. 5A to 5C are illustrative diagrams of yet another conventional apparatus.
Figure 5B:
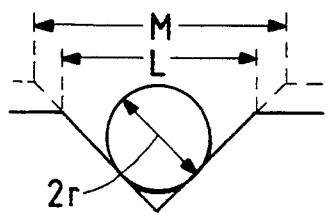
Figure 5C:
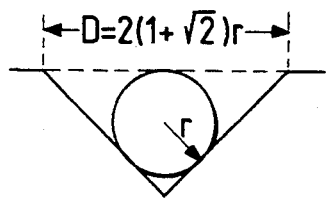

Experiments have been performed using the mechanism in FIG. 30. The results were compared to the clamp mechanism illustrated in FIG. 3. A trial production was run using single mode optical fibers for 1.3 μm band having a clad diameter of 125±1.5 μm, an MFD of 9.5±1 μm, and a cut-off wavelength of 1.2 μm, and forming a 0.25 μm diameter optical fiber using ultraviolet-curing resin.

An LD light source having a wavelength of 1.3 μm was introduced into one end of the fibers and the light through the respective fibers were monitored. The split ratio of the fibers was measured by a power meter detecting the light through the fibers while the fibers were being drawn. When the split ratio reached 50% of the original value, the burner was moved away from the fibers. Optical fiber couplers were made with a target split ratio of 50±3% so that the excess loss could be evaluated. The covers of the fibers were stripped off to expose about 30 mm of their glass portions, and an acetylene oxygen burner was used to fuse the fibers together. The fusing process was conducted as follows: The optical fibers were heated for five minuets to reach a temperature of 1400° C. The temperature was measured by a radiation thermometer. A weight of three grams was used for the tensile force on the fibers.

Thirty conventional couplers were tested in comparison with the couplers manufactured with an apparatus according to the invention. The conventional couplers showed an average excess loss of 0.29 dB with a maximum excess loss of 0.6 dB. The couplers made with an embodied apparatus showed an average excess loss of 0.18 dB with a maximum excess loss of 0.46 dB. Better results were achieved using the invention.

As is apparent from the above description, according to a clamp for optical fibers of the invention, the optical fibers may be aligned each time the fibers are fused during the manufacturing stage of optical fiber couplers. This allows optical fiber couplers to be manufactured with good repeatability.

The experimental results indicate that optical fiber couplers having small variation in excess loss can be manufactured. The invention is therefore advantageous in improving yield.

Further, the clamp may be automatically opened and closed, therefore saving manpower.

Similar experimental results can be obtained using the other embodiment described above.

What is claimed is:

1. An apparatus for clamping a plurality of optical fibers comprising:
   a first Y-shaped member being shaped so as to define a first slot, an upper portion of said first slot having a larger width than a lower portion of said first slot for facilitating entry of said optical fibers into said first slot;
   a second Y-shaped member being shaped so as to define a second slot, an upper portion of said second slot having a larger width than a lower portion of said second slot for facilitating entry of said optical fibers into said second slot;
   a pushing element for pushing said at least two optical fibers into said first slot and said second slot; and
   moving means for simultaneously moving said first and second Y-shaped members closer to said pushing element to effect clamping and apart from said pushing means after said fibers are coupled.

2. A clamp as described in claim 1 wherein said upper portion of said first Y-shaped member and said upper portion of second Y-shaped member are separated, said pushing element being received between said upper member of said first Y-shaped member and said upper portion of said second Y-shaped member.

3. A clamp as described in claim 1 wherein said pushing element has a protruding portion for engaging a region between said first Y-shaped member and said second Y-shaped member.

4. A clamp as described in claim 3 wherein said protruding portion of said pushing element engages said first and second Y-shaped members orthogonal to an alignment of said first slot and said second slot.

5. A clamp as described in claim 1 wherein said first Y-shaped member is connected to said second Y-shaped member.

6. A clamp as described in claim 1 wherein said first slot is aligned with said second slot.

7. A method for clamping a plurality of optical fibers between at least two Y-shaped members and a pushing element, each Y-shaped member being shaped so as to define a slot having a narrow region and a wide region, said method comprising the steps of:
   simultaneously moving said Y-shaped members closer to said pushing element to collect optical fibers in said Y-shaped members;
   receiving optical fibers in said wide regions of said slots within said Y-shaped members; and
   inserting said pushing element into an area between said Y-shaped members which is orthogonal to said slots to clamp said optical fibers in said narrow regions of said slots in said Y-shaped members.

* * * * *